United States Patent
Lu et al.

(10) Patent No.: US 12,089,064 B2
(45) Date of Patent: Sep. 10, 2024

(54) BEAMFORMING METHOD AND APPARATUS, RADIO ACCESS NETWORK DEVICE, AND READABLE STORAGE MEDIUM

(71) Applicant: HUAWEI TECHNOLOGIES CO., LTD., Shenzhen (CN)

(72) Inventors: Jun Lu, Shanghai (CN); Juan Ao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 17/592,590

(22) Filed: Feb. 4, 2022

(65) Prior Publication Data
US 2022/0159480 A1   May 19, 2022

Related U.S. Application Data

(63) Continuation of application No. PCT/CN2019/099453, filed on Aug. 6, 2019.

(51) Int. Cl.
*H04W 16/28* (2009.01)
*G06N 20/00* (2019.01)
(Continued)

(52) U.S. Cl.
CPC .......... *H04W 16/28* (2013.01); *G06N 20/00* (2019.01); *H04L 5/0048* (2013.01); *H04W 28/0236* (2013.01); *H04W 28/0958* (2020.05)

(58) Field of Classification Search
CPC .......... H04W 16/28; H04W 28/0236; H04W 28/0958; G06N 20/00; H04L 5/0048; H04L 5/0091; H04B 7/086; H04B 7/063
See application file for complete search history.

(56) References Cited

U.S. PATENT DOCUMENTS 9,985,714 B1    5/2018  Hou
2016/0330643 A1*  11/2016  Sahin .................. H04W 24/10
(Continued)

FOREIGN PATENT DOCUMENTS

CN    101547448 A    9/2009
CN    104767555 A    7/2015
(Continued)

OTHER PUBLICATIONS

India Office Action issued in corresponding India Application No. 202247008237, dated Sep. 13, 2022, pp. 1-6.
(Continued)

*Primary Examiner* — Kenneth T Lam
(74) *Attorney, Agent, or Firm* — HAUPTMAN HAM, LLP

(57) ABSTRACT

A beamforming method includes obtaining feature data. The feature data includes at least one of feature data of a terminal device or feature data of a cell. The feature data of the terminal device represents azimuth information of the terminal device, and the feature data of the cell represents load information of the cell and distribution information of the terminal device. The beamforming method further includes obtaining a beamforming parameter based on the feature data and a machine learning model. The beamforming parameter includes at least one of a beam direction, a beam width, or a quantity of beams. The beamforming method further includes performing beamforming on a first signal based on the beamforming parameter.

20 Claims, 5 Drawing Sheets

(51) Int. Cl.
*H04L 5/00* (2006.01)
*H04W 28/02* (2009.01)
*H04W 28/08* (2023.01)

(56) References Cited

U.S. PATENT DOCUMENTS

| | | | |
|---|---|---|---|
| 2018/0262918 A1 | | 9/2018 | Zhao et al. |
| 2019/0207672 A1* | | 7/2019 | Arora ................. H04B 7/18584 |
| 2019/0320364 A1* | | 10/2019 | Jeon ..................... H04B 7/0695 |
| 2022/0158702 A1* | | 5/2022 | Nallampatti Ekambaram ............ H04B 7/086 |

FOREIGN PATENT DOCUMENTS

| | | | |
|---|---|---|---|
| CN | 105122662 A | 12/2015 | |
| CN | 107431678 A | 12/2017 | |
| CN | 109327248 A | 2/2019 | |
| CN | 109964436 A | 7/2019 | |

OTHER PUBLICATIONS

Extended European Search Report issued in corresponding European Application No. 19940764.4, dated Jul. 6, 2022, pp. 1-8.
Chinese Office Action issued in corresponding Chinese Application No. 201980098715.6, dated Oct. 17, 2023, pp. 1-8.
International Search Report issued in corresponding International Application No. PCT/CN2019/099453, dated Apr. 28, 2020, pp. 1-10.

* cited by examiner

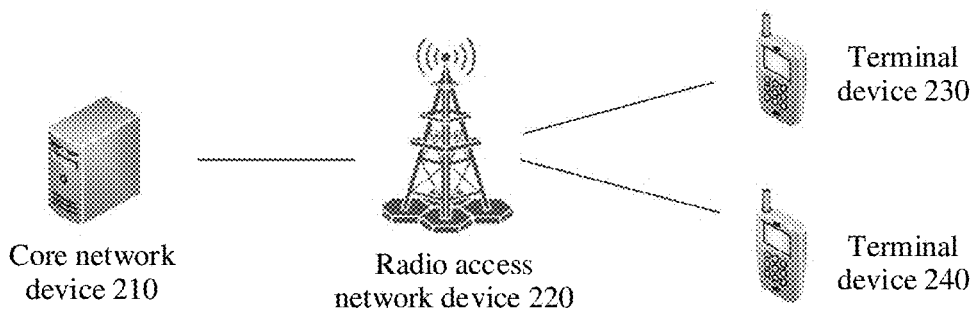

FIG. 1

Obtain feature data, where the feature data includes at least one of the feature data of a terminal device and the feature data of a cell, the feature data of the terminal device is used to represent azimuth information of the terminal device, and the feature data of a cell is used to ensure load information and terminal device distribution information of the cell — S201

Obtain a beamforming parameter based on the feature data and a machine learning model, where the beamforming parameter includes at least one of a beam direction, a beam width, and a quantity of beams — S202

Perform beamforming on a to-be-sent signal based on the beamforming parameter — S203

FIG. 2

BEAMFORMING METHOD AND APPARATUS, RADIO ACCESS NETWORK DEVICE, AND READABLE STORAGE MEDIUM

CROSS-REFERENCE TO RELATED APPLICATIONS

This application is a continuation of International Application No. PCT/CN2019/099453, filed on Aug. 6, 2019, the disclosure of which is hereby incorporated by reference in its entirety.

BACKGROUND

Massive MIMO (Massive MIMO) is a technology in which a large quantity (for example, 64/128/256) of array antennas are used on a base station transceiver to achieve larger amount of wireless data traffic and higher connection reliability. Beamforming is a multi-antenna transmission technology applied to antenna arrays with a small spacing. In beamforming, a strong correlation of spatial channels and an interference principle of waves are used to generate a strong directional radiation pattern, so that a main lobe of the radiation pattern adaptively points to a user's incoming wave direction, to improve a signal-to-noise ratio and a system capacity or a coverage area. In a massive MIMO-based long term evolution (LTE) system, a base station performs beamforming on an active antenna unit (AAU), to form one or more beams on a horizontal plane and a vertical plane. Spatial multiplexing is performed within a coverage area of the AAU, to improve a transmission capacity in the coverage area of the AAU.

In some approaches, when the beamforming is performed on the AAU in the massive MIMO-based LTE system, a quantity of beams, a beam direction, and a beam width are first preset, and then the beamforming is performed based on the preset quantity of beams, beam direction, and beam width.

However, the method in some approaches cannot maximize the transmission capacity in the coverage area of the AAU.

SUMMARY

One or more embodiments of the present application provide a beamforming method and apparatus, a radio access network device, and a readable storage medium, to maximize a transmission capacity in a coverage area of an AAU.

According to a first aspect, at least an embodiment of the present disclosure provides a beamforming method. In this method, a radio access network device first obtains feature data, where the feature data includes at least one of feature data of a terminal device and feature data of a cell. The feature data of the terminal device is used to represent azimuth information of the terminal device, and the feature data of the cell is used to represent load information of the cell and distribution information of the terminal device. After obtaining the feature data, the radio access network device obtains a beamforming parameter based on the feature data and a machine learning model, where the beamforming parameter includes at least one of a beam direction, a beam width, and a quantity of beams. After obtaining the beamforming parameter, the radio access network device performs beamforming on a to-be-sent signal based on the beamforming parameter.

In the foregoing method, after obtaining the feature data of the terminal device or the feature data of the cell, the radio access network device may obtain the beamforming parameter based on the feature data and the machine learning model, and may further perform the beamforming on the to-be-sent signal based on the beamforming parameter. Because the feature data of the terminal device represents the azimuth information of the terminal device within a coverage area of the radio access network device, and the feature data of the cell represents the load information of the cell and the distribution information of the terminal device within the coverage area of the radio access network device, the beamforming parameter obtained by the machine learning model based on the feature data is a parameter that can adapt to an actual condition of the cell or the terminal device within the coverage area of the radio access network device. Therefore, when the beamforming is performed on the to-be-sent signal based on the beamforming parameter, a beam can be more accurately directed to a direction in which the terminal device is centralized or is heavily loaded, or an optimal quantity of beams can be selected, so that the transmission capacity in the coverage area of the radio access network device is maximized.

In some embodiments, when the beamforming parameter is obtained based on the feature data and the machine learning model, the feature data of the terminal device may be first input into a first machine learning model, where the first machine learning model is used to perform clustering processing on the feature data of the terminal device. Then, the beam direction and the beam width are determined based on a clustering processing result of the first machine learning model.

In some embodiments, the beam direction and the beam width may be determined by using the following process:
obtaining an azimuth center of each beam based on the clustering processing result of the first machine learning model, obtaining the beam direction of each beam based on the azimuth center of the beam; and determining the beam width of each beam based on the azimuth information of the terminal device corresponding to the beam in the clustering processing result.

In some embodiments, after the beamforming parameter is obtained based on the feature data and the machine learning model, the following processing may be further performed:
adjusting the beamforming parameter based on preset constraint information, where the constraint information includes at least one of coverage constraint information, interference constraint information, and load balancing constraint information.

In some embodiments, the feature data of the terminal device may include a horizontal azimuth and/or a vertical azimuth of the terminal device.

When the feature data of the terminal device includes the horizontal azimuth and/or the vertical azimuth of the terminal device, in a manner, when the feature data is obtained, the horizontal azimuth and/or the vertical azimuth of the terminal device may be obtained based on measurement information of an uplink received signal. In another manner, when the feature data is obtained, the horizontal azimuth and/or the vertical azimuth of the terminal device may be obtained based on measurement information of a downlink reference signal and location information of the terminal device.

In some embodiments, the feature data of the terminal device is further used to represent traffic volume information of the terminal device and/or information about a quantity of resource blocks used by the terminal device.

In some embodiments, when the beamforming parameter is obtained based on the feature data and the machine learning model, the feature data of the cell may be first input into a second machine learning model, where the second machine learning model is used to perform prediction processing based on the feature data of the cell. After a prediction processing result is obtained, the quantity of beams are determined based on the prediction processing result of the second machine learning model.

In some embodiments, the radio access network device may determine the quantity of beams based on the feature data of the cell and the second machine learning model. Because the feature data of the cell is data that can represent load of the cell and a distribution status of the terminal device, the quantity of beams that is obtained by the second machine learning model based on the feature data of the cell is an optimal quantity of beams that matches the load of the cell and the distribution status of the terminal device. The beamforming is performed based on the quantity of beams, so that the transmission capacity in the coverage area of the radio access network device can be maximized, and best user experience can be got. For example, when overall load of the cell is light or a quantity of terminal devices in an area is small, the quantity of beams may be reduced, to reduce inter-beam interference and improve user experience. When the overall load of the cell is high, the quantity of beams may be increased to improve a cell capacity.

In some embodiments, the quantity of beams may be determined by using the following process:

determining, based on a correspondence between a cell key indicator and a quantity of cells, a quantity of cells that is corresponding to an optimal cell key indicator, where the correspondence is output by the second machine learning model, and determining the quantity of beam quantity of beams based on the quantity of cells that is corresponding to the optimal cell key indicator.

In some embodiments, the quantity of beams may alternatively be determined by using the following process:

determining the quantity of beams based on a quantity of cells that is output by the second machine learning model.

In some embodiments, the second machine learning model may be pre-obtained through training based on periodically obtained feature data of the cell.

According to a second aspect, at least an embodiment of this application provides a beamforming apparatus, and the apparatus includes a processing module.

The processing module is configured to: obtain feature data, where the feature data includes at least one of feature data of a terminal device and feature data of a cell, the feature data of the terminal device is used to represent azimuth information of the terminal device, and the feature data of the cell is used to represent load information of the cell and distribution information of the terminal device. The processing module: obtain a beamforming parameter based on the feature data and a machine learning model, where the beamforming parameter includes at least one of a beam direction, a beam width, and a quantity of beams: and perform beamforming on a to-be-sent signal based on the beamforming parameter.

In some embodiments, the processing module is specifically configured to:

input the feature data of the terminal device into a first machine learning model, where the first machine learning model is used to perform clustering processing on the feature data of the terminal device: and determine the beam direction and the beam width based on a clustering processing result of the first machine learning model.

In some embodiments, the processing module is specifically configured to: obtain an azimuth center of each beam based on the clustering processing result of the first machine learning model: obtain the beam direction of each beam based on the azimuth center of the beam: and determine the beam width of each beam based on the azimuth information of the terminal device corresponding to the beam in the clustering processing result.

In some embodiments, the processing module is further configured to:

adjust the beamforming parameter based on preset constraint information, where the constraint information includes at least one of coverage constraint information, interference constraint information, and load balancing constraint information.

In some embodiments, the feature data of the terminal device includes a horizontal azimuth and/or a vertical azimuth of the terminal device.

In some embodiments, the processing module is specifically configured to:

obtain the horizontal azimuth and/or the vertical azimuth of the terminal device based on measurement information of an uplink received signal.

In some embodiments, the processing module is specifically configured to:

obtain the horizontal azimuth and/or the vertical azimuth of the terminal device based on measurement information of a downlink reference signal and location information of the terminal device.

In some embodiments, the feature data of the terminal device is further used to represent traffic volume information of the terminal device and/or information about a quantity of resource blocks used by the terminal device.

In some embodiments, the processing module is specifically configured to:

input the feature data of the cell into a second machine learning model, where the second machine learning model is used to perform prediction processing based on the feature data of the cell: and determine the quantity of beams based on a prediction processing result of the second machine learning model.

In some embodiments, the processing module is specifically configured to:

determine, based on a correspondence between a cell key indicator and a quantity of cells, a quantity of cells that is corresponding to an optimal cell key indicator, where the correspondence is output by the second machine learning model; and determine the quantity of beams based on the quantity of cells that is corresponding to the optimal cell key indicator.

In some embodiments, the processing module is specifically configured to:

determine the quantity of beams based on a quantity of cells that is output by the second machine learning model.

In some embodiments, the second machine learning model is pre-obtained through training based on periodically obtained feature data of the cell.

According to a third aspect, at least an embodiment of the present disclosure provides a radio access network device. The radio access network device includes a memory, a processor, and a transceiver. The processor is coupled to the memory, and is configured to read and execute instructions in the memory, to implement steps of the method according to the first aspect. The transceiver is coupled to the processor, and the processor controls the transceiver to receive and send message.

According to a fourth aspect, at least an embodiment of the present disclosure provides a computer program product, where the computer program product includes computer program code, and when the computer program code is executed by a computer, the computer is enabled to perform the method according to the first aspect.

According to a fifth aspect, at least an embodiment of the present disclosure provides a computer-readable storage medium, where the computer storage medium stores computer instructions, and when the computer instructions are executed by a computer, the computer is enabled to perform the method according to the first aspect.

According to a sixth aspect, at least an embodiment of the present disclosure provides a chip, where the chip is connected to a memory, and configured to read and execute a software program stored in the memory, to implement the method according to the first aspect.

According to a seventh aspect, at least an embodiment of the present disclosure provides an apparatus. The apparatus includes an input interface circuit, a logic circuit, and an output interface circuit, where the logic circuit is configured to perform the method according to the first aspect.

BRIEF DESCRIPTION OF DRAWINGS

FIG. 1 is a schematic architectural diagram of a mobile communication system to which at least an embodiment of the present disclosure is applied:

FIG. 2 is a schematic flowchart of a beamforming method according to at least an embodiment of the present disclosure;

DESCRIPTION OF EMBODIMENTS

Figure 3:
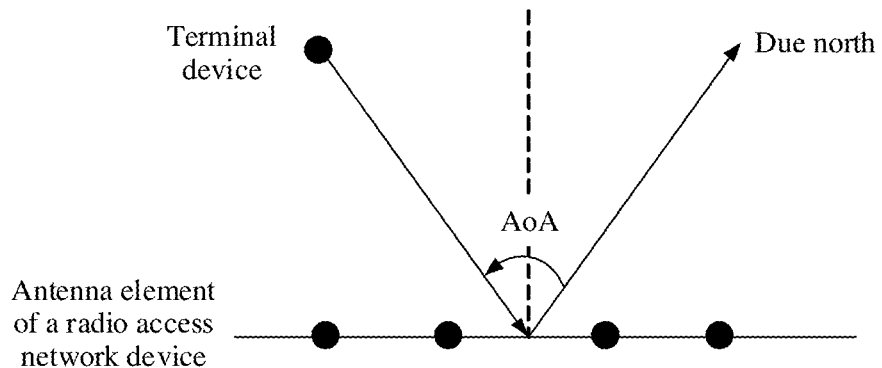
FIG. 3 is an example diagram of an AoA.

In some approaches, when beamforming is performed, a quantity of beams, a beam direction, and a beam width are all preset information. Regardless of any change in a terminal device of a cell, a base station performs the beamforming based on the preset information. In this way, a main lobe direction of a beam formed by an AAU may not be aligned with a direction in which the terminal device is centralized for shaping, or a quantity of beams cannot adapt to current cell load and a distribution status of the terminal device, and a transmission capacity in a coverage area of the AAU cannot be maximized.

The technical solutions in the embodiments of this application are intended to resolve the foregoing problem.

FIG. 1 is a schematic architectural diagram of a mobile communication system to which at least an embodiment of the present disclosure is applied. As shown in FIG. 1, the mobile communication system includes a core network device 210, a radio access network device 220, and at least one terminal device (a terminal device 230 and a terminal device 240 in FIG. 1). The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or some functions of the core network device and some functions of the radio access network device may be integrated into one physical device. The terminal device may be at a fixed location or is movable. FIG. 1 is only a schematic diagram. The communication system may further include another network device, for example, may further include a wireless relay device and a wireless backhaul device, which are not shown in FIG. 1. A quantity of core network devices, a quantity of radio access network device, and a quantity of terminal devices included in the mobile communication system are not limited in the embodiments of this application.

The radio access network device is an access device used by the terminal device to access the mobile communication system in a wireless manner, and may be a network side NodeB, an evolved network side eNodeB, a network side in a 5G mobile communication system, a network side in a future mobile communication system, an access node in a Wi-Fi system, or the like. A specific used technology and a specific device form of the radio access network device are not limited in the embodiments of this application.

The terminal device may also be referred to as a terminal Terminal, user equipment (UE), a mobile station (MS), a mobile terminal (mobile terminal, MT), or the like. The terminal device may be a mobile phone (mobile phone), a pad (Pad), a computer with a wireless transceiver function, a virtual reality (VR) terminal device, an augmented reality (AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The radio access network device and the terminal device each may be deployed on the land, including an indoor device, an outdoor device, a handheld device, or a vehicle-mounted device: may be deployed on the water: or may be deployed on an airplane, a balloon, and a satellite in the air. Application scenarios of the radio access network device and the terminal device are not limited in the embodiments of this application.

The embodiments of this application may be applied to downlink signal transmission.

FIG. 2 is a schematic flowchart of a beamforming method according to at least an embodiment of the present disclosure. The method is executed by the foregoing radio access network device. As shown in FIG. 2, the method includes the following steps.

S201: Obtain feature data, where the feature data includes at least one of feature data of a terminal device and feature data of a cell. The feature data of the terminal device is used to represent azimuth information of the terminal device, and the feature data of the cell is used to represent load information of the cell and distribution information of terminal device.

In some embodiments, the feature data includes feature data of a plurality of terminal devices. The feature data of the terminal devices is used to represent azimuth information of the plurality of terminal devices within a coverage area of the radio access network device.

In some embodiments, the azimuth information of the terminal device may include a horizontal azimuth and/or a vertical azimuth of the terminal device.

The horizontal azimuth and the vertical azimuth of the terminal device may be obtained by using angles of departure (AODs). After the angles of departure are determined, the angle of department at a horizontal plane may be used as the horizontal azimuth of the terminal device, and the angle of departure at a vertical plane is used as the vertical azimuth angle of the terminal device. A manner of determining the AoD is described in detail in the following embodiments.

The feature data of the terminal device may be obtained by periodically collecting statistics on feature data of a large quantity of terminal devices within the coverage area of the radio access network device.

In some embodiments, the feature data includes feature data of a cell. The feature data of the cell is used to represent load information of the cell and distribution information of the terminal device, where the cell and the terminal device are within the coverage area of the radio access network device.

In some embodiments, the load information of the cell and the distribution information of the terminal device may include a quantity of terminal devices of the cell, cell traffic volume information, and the like.

The feature data of the cell may be obtained by periodically collecting statistics on a quantity of terminal devices in the cell within the coverage area of the radio access network device, the cell traffic volume information, and the like.

S202: Obtain a beamforming parameter based on the feature data and a machine learning model, where the beamforming parameter includes at least one of a beam direction, a beam width, and a quantity of beams.

Machine learning is a technology in which computer science, optimization theory, neuroscience, statistics and the like are integrated. A process of the machine learning may include two stages: a prototype design stage and an application stage. At the prototype design stage, historical data is used to train one or more machine learning models that are suitable for solving a target task. In addition, a model is verified and evaluated, to select an appropriate machine learning model by using an evaluation metric. At the application phase, the selected machine learning model is online, and the machine learning model is used to process new data. Based on application scenarios of the machine learning model, the machine learning model may use different machine learning algorithms. The machine learning algorithms may include, for example, clustering, classification, and regression.

The machine learning model in this step refers to the machine learning model trained and selected by using the historical data. After the feature data is input into the machine learning model, the machine learning model obtains a processing result based on the feature data. The beamforming parameter may be obtained based on the processing result of the machine learning model.

In some embodiments, the beamforming parameter includes the beam direction and the beam width. After the feature data is input into the machine learning model, the machine learning model obtains a processing result based on the feature data. The beam direction and the beam width may be obtained based on the processing result of the machine learning model.

In some embodiments, the beamforming parameter includes the quantity of beams. After the feature data is input into the machine learning model, the machine learning model obtains a processing result based on the feature data. The quantity of beams may be obtained based on the processing result of the machine learning model.

S203: Perform beamforming on a to-be-sent signal based on the beamforming parameter.

For example, in an LTE system, after obtaining the beamforming parameter in the foregoing steps S201 and S202, the eNodeB controls a phase and an amplitude of the to-be-sent signal on an AAU based on the beamforming parameter, and directs a beam to a direction in which at least one terminal device is relatively centralized. In this way, the to-be-sent signal is sent to the at least one terminal device in a relatively centralized manner, so that a transmission capacity in the coverage area of the radio access network device is maximized.

In this embodiment, after obtaining the feature data of the terminal device or the feature data of the cell, the radio access network device may obtain the beamforming parameter based on the feature data and the machine learning model, and may further perform the beamforming on the to-be-sent signal based on the beamforming parameter. Because the feature data of the terminal device represents the azimuth information of the terminal device within the coverage area of the radio access network device, and the feature data of the cell represents the load information of the cell and the distribution information of the terminal device within the coverage area of the radio access network device, the beamforming parameter obtained by the machine learning model based on the feature data is a parameter that can adapt to an actual condition of a cell or a terminal device within the coverage area of the radio access network device. Therefore, when the beamforming is performed on the to-be-sent signal based on the beamforming parameter, the beam can be more accurately directed to a direction in which the terminal device is centralized or is heavily loaded, or optimal quantity of beams can be selected, so that the transmission capacity in the coverage area of the radio access network device is maximized.

As discussed above, the feature data may include the feature data of the terminal device or the feature data of the cell, and the beamforming parameter obtained based on the feature data and the machine learning model includes at least one of the beam direction, the beam width, and the quantity of beams. In a specific implementation process, at least the following two optional implementations may be included.

In a first optional implementation, the feature data of the terminal device may be first obtained, and then the beam direction and the beam width are obtained based on the feature data of the terminal device and the machine learning model.

In a second optional implementation, the feature data of the cell may be first obtained, and then the quantity of beams are obtained based on the feature data of the cell and the machine learning model.

In the foregoing two optional implementations, the used machine learning models may be different machine learning models. For ease of differentiation, in the embodiment of this application, the machine learning model used in the foregoing first optional implementation is referred to as a first machine learning model, and the machine learning model used in the second optional implementation is referred to as a second machine learning model.

In a specific implementation process, the foregoing two optional implementations may be implemented separately, or may be implemented in combination. In an example, assuming that the foregoing first optional implementation is independently implemented, the beamforming may be performed by using the beam direction and the beam width after the beam direction and the beam width are obtained. In another example, assuming that the foregoing first optional implementation and the foregoing second optional implementation are implemented in combination, the beamforming is performed based on the beam direction, the beam width, and the quantity of beams, after the beam direction, the beam width, and the quantity of beams may be separately obtained by performing the two optional implementations.

The following separately describes the foregoing two optional implementations.

In the first optional implementation of the foregoing, feature data of the terminal device may be first obtained. As discussed above, the feature data of the terminal device may include the horizontal azimuth and/or the vertical azimuth of the terminal device.

In some embodiments, the horizontal azimuth and/or the vertical azimuth of the terminal device may be obtained in either of the following two manners.

In a first manner, the AoD may be obtained based on the measurement information of the uplink received signal, and the horizontal azimuth and/or the vertical azimuth of the terminal device may be further obtained. After the AoD is determined, the angle of the departure at the horizontal plane may be used as the horizontal azimuth of the terminal device, and the angle of departure at the vertical plane may be used as the vertical azimuth of the terminal device. That is, the horizontal azimuth and/or the vertical azimuth of the terminal device may be obtained based on the measurement information of the uplink received signal.

In some embodiments, the measurement information of the uplink received signal may be an angle of arrival (AOA).

In some embodiments, based on uplink and downlink reciprocity, a downlink AoD is approximately equal to an uplink AoA Therefore, after the AoA is obtained, the AoA may be used as the AoD.

FIG. 3 is an example diagram of the AoA. As shown in FIG. 3, an included angle between the due north and a connection line between the terminal device and an antenna element of the radio access network device is the AoA.

In some embodiments, the radio access network device may determine the AoA by using the following process.

Figure 4:
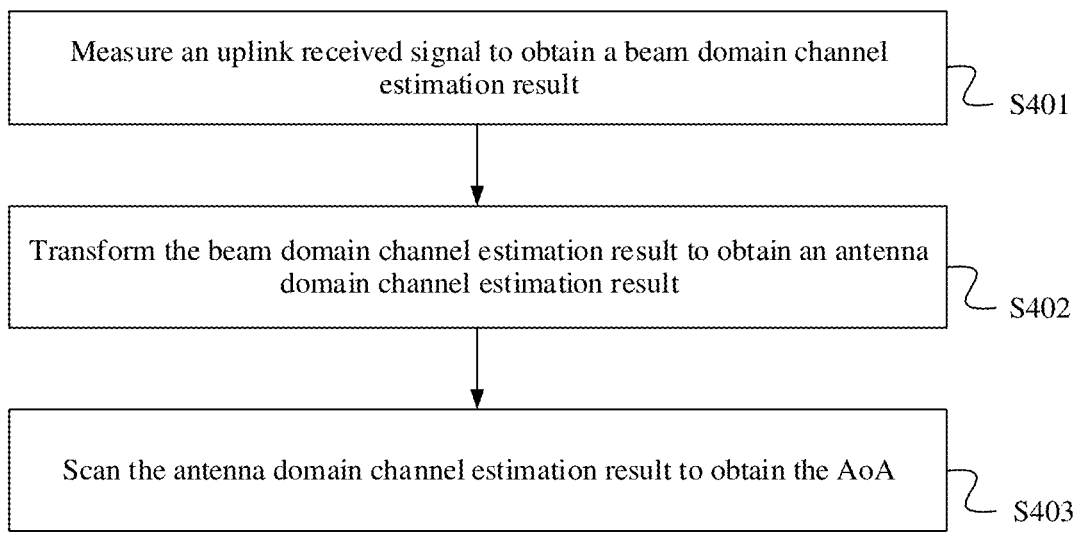
FIG. 4 is a schematic flowchart of a beamforming method according to at least an embodiment of the present disclosure.

FIG. 4 is a schematic flowchart of a beamforming method according to at least an embodiment of the present disclosure. As shown in FIG. 4, an optional manner of determining an AoA by a radio access network device includes the following steps.

S401: Measure an uplink received signal to obtain a beam domain channel estimation result.

In some embodiments, the uplink received signal may be an uplink reference signal. For example, the uplink reference signal may be a sounding reference signal (SRS) or a demodulation reference signal (DMRS).

In some embodiments, the beam domain channel estimation result may be a beam domain channel matrix.

After receiving the uplink received signal, the radio access network device may obtain the beam domain channel matrix by measuring the signal.

S402: Transform the beam domain channel estimation result to obtain an antenna domain channel estimation result.

In some embodiments, an antenna domain matrix may be obtained through transformation by using the following formula (1).

$$H_A = W_{B2A} H_B \quad (1)$$

$H_A$ represents the antenna domain matrix, $H_B$ represents the beam domain channel estimation result obtained in step S401, and $W_{B2A}$ represents a transformation matrix from a beam domain to an antenna domain.

In some embodiments, after the antenna domain matrix is obtained, covariance calculation may be performed on the antenna domain matrix to obtain a covariance matrix of the antenna domain matrix, and the covariance matrix is used as the foregoing antenna domain channel estimation result.

S403: Perform scanning processing on the antenna domain channel estimation result to obtain the AoA.

In some embodiments, after the covariance matrix is obtained, a channel spatial spectrum may be scanned, to determine a peak location of a maximum spatial spectrum, and the peak location is used as the AoA.

After the AoA is obtained through the foregoing process, an AoD may be obtained based on the foregoing processing process, and then a horizontal azimuth and/or a vertical azimuth of a terminal device is obtained.

In a second manner, a horizontal azimuth and/or a vertical azimuth of a terminal device may be obtained based on measurement information of a downlink reference signal and location information of the terminal device.

In some embodiments, the measurement information of the downlink reference signal may be reference signal received power (ssd, RSRP).

In some embodiments, the terminal device may obtain location information of the radio access network device in advance, and the location information may be longitude and latitude of the radio access network device. In addition, the terminal device may obtain longitude and latitude of the terminal device. The terminal device may calculate the horizontal azimuth and/or the vertical azimuth of the terminal device relative to the radio access network device based on the longitude and latitude of the radio access network device and the longitude and latitude of the terminal device.

In one case, the terminal device may obtain the location information of the terminal device in advance, and the location information may be the longitude and latitude of the terminal device. For example, the terminal device may obtain the location information of the terminal device by using a global positioning system (GPS). Further, the horizontal azimuth and/or the vertical azimuth of the terminal device relative to the radio access network device may be calculated based on the longitude and latitude of the radio access network device and the longitude and latitude of the terminal device.

In another case, if the terminal device cannot obtain the location information of the terminal device in advance, the terminal device may derive the location information of the terminal device based on the measurement information of the downlink reference signal, for example, the foregoing RSRP. Further, the horizontal azimuth and/or the vertical azimuth of the terminal device relative to the radio access network device are calculated based on the longitude and latitude of the radio access network device and the longitude and latitude of the terminal device.

In the foregoing first optional implementation, optionally, the feature data of the terminal device may not only include the foregoing horizontal azimuth and/or vertical azimuth, but also can be used to represent traffic volume information (Traffic) of the terminal device and/or information about a quantity of resource blocks (RBs) used by the terminal device.

When the feature data of the terminal device is further used to represent the traffic volume information of the terminal device and/or the information about a quantity of resource blocks used by the terminal device, the feature data of the terminal device may further include traffic volume, a quantity of RBs, and the like.

Figure 5:
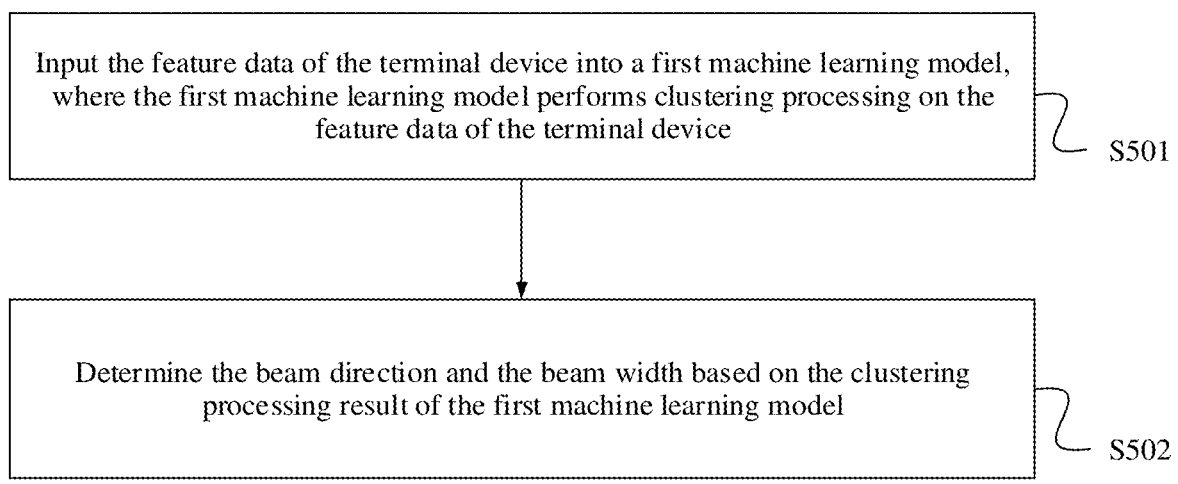
FIG. 5 is a schematic flowchart of a beamforming method according to at least an embodiment of the present disclosure.

FIG. 5 is a schematic flowchart of a beamforming method according to at least an embodiment of the present disclosure. As shown in FIG. 5, in the foregoing first optional implementation, after the horizontal azimuth and/or the vertical azimuth of the terminal device are/is obtained through the foregoing process, a beam direction and a beam width may be obtained by using the following process:

S501: Input the feature data of the terminal device into a first machine learning model, where the first machine learning model is used to perform clustering processing on the feature data of the terminal device.

In an example, the feature data of the terminal device may include only one of the horizontal azimuth and the vertical azimuth of the terminal device. In this manner, only the horizontal azimuth or the vertical azimuth of the terminal device is input into the first machine learning model.

In another example, the feature data of the terminal device may include both the horizontal azimuth and the vertical azimuth of the terminal device. In this manner, both the horizontal azimuth and the vertical azimuth of the terminal device may be input into the first machine learning model.

In still another example, the feature data of the terminal device may include both the horizontal azimuth, the vertical azimuth, traffic volume, and a quantity of RBs of the terminal device.

Table 1 is an example of the feature data of the terminal device input to the first machine learning model when the still another example is used.

TABLE 1

| Terminal device identity | Feature data of the terminal device | | | |
| --- | --- | --- | --- | --- |
| Idx 1 | Horizontal azimuth 1 | Vertical azimuth 1 | Traffic volume 1 | Quantity 1 of RBs |
| Idx 2 | Horizontal azimuth 2 | Vertical azimuth 2 | Traffic volume 2 | Quantity 2 of RBs |
| Idx 3 | Horizontal azimuth 3 | Vertical azimuth 3 | Traffic volume 3 | Quantity 3 of RBs |
| Idx 4 | Horizontal azimuth 4 | Vertical azimuth 4 | Traffic volume 4 | Quantity 4 of RBs |
| . . . | . . . | . . . | . . . | . . . |

The terminal devices in Table 1 may be a large quantity of terminal devices within a coverage area of the radio access network device.

In some embodiments, the first machine learning model may be a machine learning model using a clustering algorithm. For example, the clustering algorithm used by the first machine learning model may be a Kmeans algorithm, a hierarchical clustering algorithm, or the like. The clustering algorithm used by the first machine learning model is not limited in this embodiment of this application.

After the feature data of the plurality of terminal devices within the coverage area of the radio access network device is input into the first machine learning model, the first machine learning model may cluster the feature data into a plurality of clusters. In some embodiments, in this embodiment of this application, one cluster may be corresponding to one beam. Each cluster has a clustering center.

S502: Determine the beam direction and the beam width based on a clustering processing result of the first machine learning model.

In some embodiments, in the plurality of clusters clustered by the first machine learning model, each cluster has one clustering center, and the clustering center may be an azimuth of a beam corresponding to the cluster. The azimuth of the beam may be a horizontal azimuth and/or a vertical azimuth of the beam, and the azimuth of the beam may represent a beam direction of the beam. On this basis, the beam width may be further determined.

Figure 6:
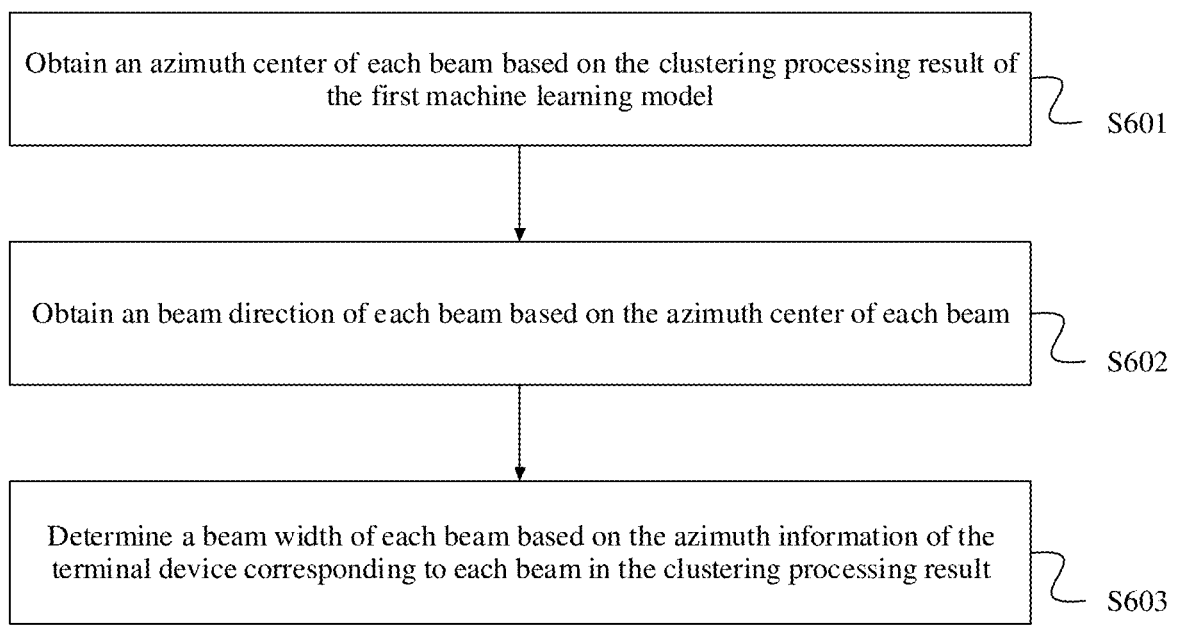
FIG. 6 is a schematic flowchart of a beamforming method according to at least an embodiment of the present disclosure.

FIG. 6 is a schematic flowchart of a beamforming method according to at least an embodiment of the present disclosure. As shown in FIG. 6, an optional manner of determining the beam direction and the beam width based on a clustering processing result in step S502 includes the following steps.

S601: Obtain an azimuth center of each beam based on the clustering processing result of the first machine learning model.

As described above, the first machine learning model may cluster a plurality of clusters, each cluster is corresponding to one beam, each cluster has one clustering center, and the clustering center is an azimuth center of a beam corresponding to the cluster.

For example, assuming that the feature data shown in Table 1 is input to the first machine learning model, the first machine learning model may output information shown in Table 2 and Table 3. Table 2 indicates a cluster into which each terminal device is clustered, and Table 3 indicates a clustering center of each cluster.

TABLE 2

| Terminal device identity | Cluster to which a terminal device is clustered |
| --- | --- |
| Idx 1 | Cluster 1 |
| Idx 2 | Cluster 2 |
| Idx 3 | Cluster 3 |
| Idx 4 | Cluster 1 |
| . . . | . . . |

TABLE 3

| Cluster | Clustering center |
| --- | --- |
| Cluster 1 | Horizontal azimuth 1 |
| Cluster 2 | Horizontal azimuth 2 |
| Cluster 3 | Horizontal azimuth 3 |
| . . . | . . . |

S602: Obtain the beam direction of each beam based on an azimuth center of the beam.

In some embodiments, the azimuth center of the beam corresponding to the cluster may be a horizontal azimuth and/or a vertical azimuth, and the horizontal azimuth and/or the vertical azimuth may represent the beam direction of the beam. Because a clustering center of a cluster represents a direction in which terminal devices are densely distributed the azimuth center of the beam corresponding to the cluster is used as the beam direction of the beam, so that the beam can be more accurately directed to a direction in which the terminal device is centralized.

For example, refer to Table 2 and Table 3. The first machine learning model outputs three clusters, and a clustering center of the cluster 1 is a horizontal azimuth 1. Because the cluster 1 is corresponding to one beam, a beam direction of the beam may be represented by using the horizontal azimuth 1.

S603: Determine the beam width of each beam based on the azimuth information of the terminal device corresponding to the beam in the clustering processing result.

In some embodiments, after the first machine learning model is used to perform clustering on the feature data of the terminal device to obtain the plurality of clusters, a terminal device included in each cluster may be determined. Each terminal device has azimuth information such as the horizontal azimuth and/or the vertical azimuth. The beam width may be determined based on the azimuth information of each terminal device in each cluster. The beam width may comply with the following constraint: The beam should cover a preset proportion of terminal devices in the cluster.

For example, assuming that the foregoing constraint is that the beam should cover 80% of the terminal devices in the cluster, a smallest horizontal azimuth and a largest horizontal azimuth of the 80% of the terminal device may be determined based on the horizontal azimuth of each terminal device included in each cluster. Further, the beam width may be a width from the smallest horizontal azimuth to the largest horizontal azimuth.

Figure 7:
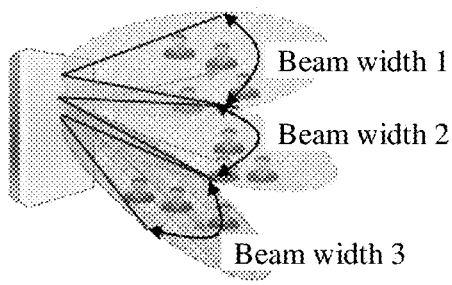
FIG. 7 is an example diagram of beam widths of different beams.

FIG. 7 is an example diagram of beam widths of different beams. As shown in FIG. 7, when three clusters (namely, three beams) and a terminal device included in each cluster (namely, each beam) are determined by using the foregoing process, beam widths (namely, a beam width 1, a beam width 2, and a beam width 3) of all the beams each are obtained based on azimuth information of the corresponding terminal device. The beam width 1 is used as an example, and the beam width 1 enables the beam to cover all terminal devices in the cluster.

When the beam width is adjusted, the beam width is determined based on distribution of the terminal device in the cluster. Therefore, the beam can be more accurately directed to a direction in which the terminal device is centralized or in which load is relatively heavy.

In the foregoing first optional implementation, the radio access network device may determine a beam direction and a beam width based on the feature data of the terminal device in the coverage area and the first machine learning model, so that the beam can be more accurately directed to a direction in which the terminal device is centralized or is heavily loaded. In this way, signal strength can be maximized. Especially in a scenario in which terminal devices are unevenly distributed, this manner can make the beam more accurately align with the terminal devices.

In some embodiments, after the beam direction and the beam width are determined in the foregoing first optional implementation, the beam direction and the beam width may be further adjusted based on preset constraint information. The preset constraint information includes at least one of coverage constraint information, interference constraint information, and load balancing constraint information.

The following separately describes a process of adjusting the beam direction and the beam width based on one of the foregoing three types of constraint information.

In a first manner, the beam direction and the beam width may be adjusted based on preset coverage constraint information.

Taking massive MIMO of LTE as an example, a coverage area of a beam is required to be 120 degrees. In this case, the beam direction and the beam width satisfy the following constraint: The sum of the beam width and a difference between the direction azimuths of the two boundary beams and the beam width should be approximately 120 degrees. The beam direction and the beam width may be adjusted by using the following formula (2) and formula (3).

$$60 - \theta_2 < A_0 + \frac{BW_i^{10}}{2} < 60 + \theta_1 \qquad (2)$$

$$60 - \theta_2 < A_0 + \frac{BW_i^{10}}{2} < 60 + \theta_1 \qquad (3)$$

$A_0$ represents the beam direction of the beam 0, $A_{N-1}$ represents the beam direction of a beam N−1, $A_0 > A_{N-1}$, $BW_i$ represents a 3 dB beam width of a beam i, $BW_i^{10}$ represents a 10 dB beam width corresponding to $BW_i$, and 01 and 02 are coverage offset azimuths preset based on an actual scenario requirement.

In a second manner, the beam direction and the beam width may be adjusted based on preset interference constraint information.

In some embodiments, to control interference between beams, a spacing between adjacent beams may be greater than a specific threshold. In addition, to control that a hole between beams is not excessively large, the spacing between adjacent beams further may be less than a specific threshold.

In an example, the beam direction and the beam width may be adjusted by using the following formula (4), so that the adjacent beams meet the foregoing interference and hole constraints.

$$\frac{BW_i^5 + BW_{i+1}^5}{2} < A_i - A_{i+1} < \frac{BW_i^{10} + BW_{i+1}^{10}}{2} \qquad (4)$$

$A_i$ represents the beam direction of the beam i, $A_{i+1}$ represents the beam direction of a beam i+1, $A_i > A_{i+1}$, $BW_i$ represents a 3 dB beam width of the beam i, $BW_i^5$ represents a 5 dB beam width corresponding to $BW_i$, and $BW_i$ represents a 10 dB beam width corresponding to $BW_i$.

In another example, the beam direction and the beam width may be adjusted by using a change in a distance between the terminal device and the center of each beam and traffic volume of the beam as constraints.

In still another example, an overlapping area of adjacent beams may be used to represent a magnitude of inter-beam interference. Then, change information of inter-beam interference is represented based on a change in a quantity of AoAs in the overlapping area. A beam direction and a beam width are adjusted based on the change information of inter-beam interference. In addition, the quantity of AoAs in the overlapping area does not increase after the adjustment.

In a third manner, the beam direction and the beam width may be adjusted based on preset load balancing constraint information.

In some embodiments, load between beams is represented by using a sample quantity (for example, a quantity of AoAs) of each beam after the beam direction and the beam width are adjusted. After the beam direction and the beam width are adjusted, a variance of a quantity of points between beams is to be reduced. The variance of a quantity of points between beams is represented by using the following formula (5).

$$V=\Sigma(i=1)^{\wedge}N[AoA(i)-\mu]^{\wedge}2 \qquad (5)$$

AoA(i) represents a quantity of AoAs of the beam i, μ represents an average quantity of AoAs of each beam, and N represents a quantity of beams for beamforming.

It should be noted that the foregoing three methods for adjusting the beam direction and the beam width based on the constraint information may be implemented separately, or may be implemented in combination.

After the beam direction and the beam width are adjusted based on the preset load balancing constraint, the beamforming can meet a load balancing requirement. After the beam direction and the beam width are adjusted based on the preset interference constraint, the beamforming can meet a beam interference requirement of a system. After the beam direction and the beam width are adjusted based on the preset coverage constraint, the beamforming can meet a beam coverage requirement of a system.

The following describes a processing process of the foregoing second optional implementation.

As described above, in the foregoing second optional implementation, the feature data of the cell may be first obtained, and then the quantity of beams are obtained based on the feature data of the cell and the machine learning model.

S801: Input the feature data of the cell into a second machine learning model, where the second machine learning model is used to perform prediction processing based on the feature data of the cell.

In an optional manner, the second machine learning model may be a regression model, and the regression model uses a regression algorithm to predict the feature data of the cell that is input into the model.

Before the regression model is used in this step, the regression model may first be trained by using historical feature data of the cell that is periodically obtained by the radio access network device.

In some embodiments, when the regression model is trained, in addition to using a quantity of terminal devices of the cell, traffic volume of the cell, an average CQI of the cell, and an average MCS of the cell as input data, a quantity of cells that is corresponding to the historical data may also be used as input data. The input data is input into the regression model, and the model may calculate a cell key indicator (KPI). The KPI may be, for example, an average terminal device-perceived rate of the cell. For ease of description, the following uses an example in which the KPI is the average terminal device-perceived rate of the cell for description. The model may use the calculated average terminal device-perceived rate of the cell as an output of the model, and learns a relationship between an input feature and the average terminal device-perceived rate of the cell.

The following Table 4 is an example of input data and output data of the foregoing regression model. As shown in Table 4, the first five columns are the input data. Based on the input data, the model may calculate and output the average terminal device-perceived rate in the last column. Further, the model can learn the relationship between the input data and the average terminal device-perceived rate of the cell based on the input data and the output data.

TABLE 4

| Quantity of cells | Quantity of terminal devices of the cell | Traffic volume of the cell | Average CQI of the cell | Average MCS of the cell | Average terminal device-perceived rate of the cell |
|---|---|---|---|---|---|
| 1 | 20 | 2 G | 10 | 15 | 10 Mbps |
| 2 | 50 | 5 G | 9.2 | 12 | 9.5 Mbps |
| 3 | 100 | 10 G | 9 | 11 | 11 Mbps |
| 4 | 200 | 20 G | 8.1 | 10 | 12 Mbps |
| 1 | 50 | 5 G | 9.5 | 11.5 | 8 Mbps |
| ... | ... | ... | ... | ... | ... |

In some embodiments, the feature data of the cell may include a quantity of terminal devices of the cell, traffic volume of the cell, an average channel quality indicator (CQI) of the cell, an average modulation and coding scheme (MCS) of the cell, and the like.

In some embodiments, the radio access network device may obtain the feature data of the cell based on a preset periodicity. After obtaining the feature data of the cell in each periodicity, the radio access network device may obtain a quantity of beams based on the following process, and flexibly perform beamforming based on the obtained quantity of beams.

Figure 8:
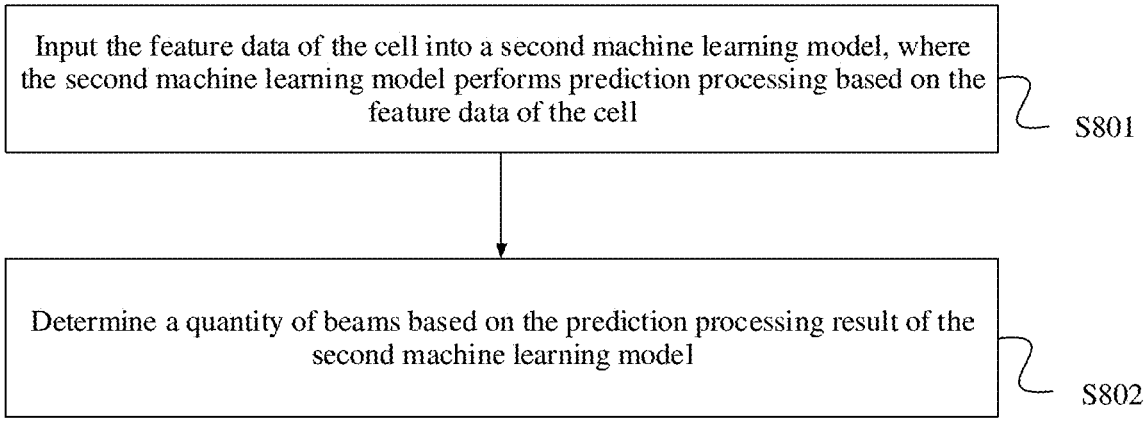
FIG. 8 is a schematic flowchart of a beamforming method according to at least an embodiment of the present disclosure.

FIG. 8 is a schematic flowchart of a beamforming method according to at least one embodiment of the present disclosure. As shown in FIG. 8, in the foregoing second optional implementation, after obtaining the feature data of the cell, the radio access network device may obtain the quantity of beams based on the following process.

After the regression model is trained, in this step, after feature data of a current cell is obtained, the feature data of the current cell may be input into the regression model, where the feature data of the current cell includes the foregoing quantity of terminal devices of the cell, the traffic volume of the cell, the average CQI of the cell, and the average MCS of the cell. The regression model may output, based on the feature data, a correspondence between a plurality of cell KPIs and a quantity of cells, and then may determine a quantity of cells that is corresponding to an optimal cell KPI based on the correspondence between the plurality of cell KPIs and the quantity of cells.

Table 5 is an example of the correspondence that is between the cell KPIs and the quantity of cells and output by the regression model. In this example, the average terminal device-perceived rate of the cell is still used as the cell KPI.

TABLE 5

| Quantity of cells | Average terminal device-perceived rate of the cell |
|---|---|
| 1 | 10 Mbps |
| 2 | 9.5 Mbps |
| 3 | 11 Mbps |
| 4 | 12 Mbps |

It can be learned from Table 5 that, in a current actual situation, if the quantity of cells is determined to be 1, the average terminal device-perceived rate of the cell is 10 Mbps, and so on. When the quantity of cells is 4, an average terminal device-perceived rate of a corresponding cell is optimal. That is, in a current actual situation, if the quantity of cells is determined to be 4, the optimal KPI can be achieved. Therefore, the quantity of cells with an optimal average terminal device-perceived rate of the cell can be selected.

In another optional manner, the second machine learning model may be a classification model, and the classification model uses a classification algorithm to predict feature data of a cell that is input into the model. For example, the classification algorithm used by the classification model may be, for example, a random forest, a support vector machine (SVM), or the like.

Before the classification model is used in this step, the classification model may first be trained by using historical feature data of the cell that is periodically obtained by the radio access network device.

In some embodiments, when the classification model is trained, in addition to using the foregoing quantity of terminal devices of the cell, the traffic volume of the cell, the average CQI of the cell, and the average MCS of the cell as input data, a cell KPI may also be used as input data. The KPI may be, for example, an average terminal device-perceived rate of the cell. For ease of description, the following uses an example in which the KPI is the average terminal device-perceived rate of the cell for description. The model may calculate and output an optimal quantity of cells based on the input data. Further, the model may learn a relationship between the input data and the optimal quantity of cells based on the input data and the output data.

Table 6 is an example of the input data and the output data of the foregoing classification model. As shown in Table 6, the first five columns are the input data. Based on the input data, the model may calculate and output the optimal quantity of cells in the last column, and learn the relationship between the input data and the optimal quantity of cells.

TABLE 6

| Quantity of terminal devices of the cell | Traffic volume of the cell | Average CQI of the cell | Average MCS of the cell | Average terminal device-perceived rate of the cell | Optimal quantity of cells |
|---|---|---|---|---|---|
| 20 | 2 G | 10 | 15 | 10 Mbps | 1 |
| 50 | 5 G | 9.2 | 12 | 9.5 Mbps | 4 |
| 100 | 10 G | 9 | 11 | 11 Mbps | 4 |
| 200 | 20 G | 8.1 | 10 | 12 Mbps | 4 |
| 50 | 5 G | 9.5 | 11.5 | 8 Mbps | 1 |
| ... | ... | ... | ... | ... | ... |

After the regression model is trained, in this step, after the feature data of the current cell is obtained, the feature data of the current cell may be input into the classification model, where the feature data of the current cell is consistent with the input data during training of the regression model. The regression model can predict a quantity of cells based on the feature data. The quantity of cells is the optimal quantity of cells in the current actual situation.

S802: Determine the quantity of beams based on a prediction processing result of the second machine learning model.

It can be learned from the foregoing step S801 that, based on an output result of the second machine learning model, namely, the prediction processing result, the optimal quantity of cells in the current actual situation may be obtained. The quantity of beams may be determined based on the quantity of cells.

For example, the quantity of cells may be used as the quantity of beams in a massive MIMO-based LTE system.

In the foregoing first optional implementation, the radio access network device may determine the quantity of beams based on the feature data of the cell and the second machine learning model. Because the feature data of the cell is data that can represent load of the cell and a distribution status of the terminal device, the quantity of beams that is obtained by the second machine learning model based on the feature data of the cell is an optimal quantity of beams that matches the load of the cell and distribution of the terminal device. Beamforming is performed based on the quantity of beams, so that a transmission capacity in a coverage area of the radio access network device can be maximized, and best user experience can be got. For example, when overall load of a cell is light or a quantity of terminal devices in an area is small, the quantity of beams may be reduced to reduce inter-beam interference and improve user experience. When the overall load of the cell is high, the quantity of beams may be increased to improve a cell capacity.

Figure 9:
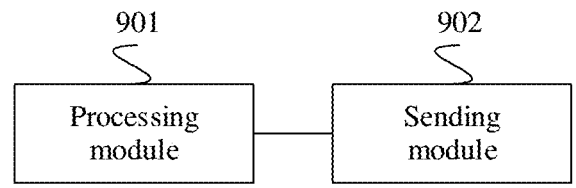
FIG. 9 is a module diagram of a structure of a beamforming apparatus according to at least an embodiment of the present disclosure.

FIG. 9 is a module diagram of a structure of a beamforming apparatus according to at least an embodiment of the present disclosure. The apparatus may be the radio access network device described in the foregoing embodiments. Alternatively, the apparatus may be an apparatus that can implement a function of the radio access network device in the method provided in the embodiments of this application. For example, the apparatus may be an apparatus or a chip system in the radio access network device. As shown in FIG. 9, the apparatus includes a processing module 901.

The processing module 901 is configured to: obtain feature data, where the feature data includes at least one of feature data of a terminal device and feature data of a cell. The feature data of the terminal device is used to represent azimuth information of the terminal device, and the feature data of the cell is used to represent load information of the cell and distribution information of terminal device:

obtain a beamforming parameter based on the feature data and a machine learning model, where the beamforming parameter includes at least one of a beam direction, a beam width, and a quantity of beams; and perform beamforming on a to-be-sent signal based on the beamforming parameter.

Still refer to FIG. 9. In some embodiments, the foregoing apparatus further includes a sending module 902. The sending module 902 is configured to send the to-be-sent signal.

An LTE system is used as an example. The foregoing apparatus performs the beamforming on the to-be-sent signal based on the beamforming parameter, and sends the to-be-sent signal to the terminal device in a relatively centralized manner by using the sending module 902, so that a transmission capacity in a coverage area of the radio access network device is maximized.

In some embodiments, the processing module 901 is specifically configured to:

input the feature data of the terminal device into a first machine learning model, where the first machine learning model is used to perform clustering processing on the feature data of the terminal device; and determine the beam direction and the beam width based on a clustering processing result of the first machine learning model.

In some embodiments, the processing module 901 is specifically configured to:

obtain an azimuth center of each beam based on the clustering processing result of the first machine learning model;

obtain a beam direction of each beam based on an azimuth center of the beam; and determine the beam width of each beam based on the azimuth information of the terminal device corresponding to the beam in the clustering processing result.

In some embodiments, the processing module 901 is further configured to:

adjust the beamforming parameter based on preset constraint information, where the constraint information includes at least one of coverage constraint information, interference constraint information, and load balancing constraint information.

In some embodiments, the feature data of the terminal device includes a horizontal azimuth and/or a vertical azimuth of the terminal device.

In some embodiments, the processing module 901 is specifically configured to:

obtain the horizontal azimuth and/or the vertical azimuth of the terminal device based on measurement information of an uplink received signal.

In some embodiments, the processing module 901 is specifically configured to:

obtain the horizontal azimuth and/or the vertical azimuth of the terminal device based on measurement information of a downlink reference signal and location information of the terminal device.

In some embodiments, the feature data of the terminal device is further used to represent traffic volume information of the terminal device and/or information about a quantity of resource blocks used by the terminal device.

In some embodiments, the processing module 901 is specifically configured to:

input the feature data of the cell into a second machine learning model, where the second machine learning model is used to perform prediction processing based on the feature data of the cell; and determine the quantity of beams based on a prediction processing result of the second machine learning model.

In some embodiments, the processing module 901 is specifically configured to:

determine, based on a correspondence between a cell key indicator and a quantity of cells, a quantity of cells that is corresponding to an optimal cell key indicator, where the correspondence is output by the second machine learning model; and determine the quantity of beams based on the quantity of cells that is corresponding to the optimal cell key indicator.

In some embodiments, the processing module 901 is specifically configured to:

determine the quantity of beams based on the quantity of cells that is output by the second machine learning model.

In some embodiments, the second machine learning model is pre-obtained through training based on periodically obtained feature data of the cell.

The beamforming device provided in this embodiment of this application may perform the method steps in the foregoing method embodiments. Implementation principles and technical effects thereof are similar, and details are not described herein again.

It should be noted that, it should be understood that division into the modules of the foregoing apparatus is merely logical function division, and in actual implementation, all or some modules may be integrated into one physical entity, or may be physically separated. In addition, all these modules may be implemented in a form of software invoked by a processing element, or may be implemented in a form of hardware. Alternatively, some modules may be implemented in a form of software invoked by a processing element, and some modules are implemented in a form of hardware. For example, the determining module may be a processing element separately disposed, or may be integrated into a chip of the foregoing apparatus for some embodiments. In addition, the determining module may alternatively be stored in a memory of the foregoing apparatus in a form of program code, and is invoked by a processing element of the foregoing apparatus to perform a function of the foregoing determining module. In some embodiments, another module is similar to at least the embodiments of the determining module. In addition, all or some of these modules may be integrated together, or may be implemented separately. The processing element described herein may be an integrated circuit, and has a signal processing capability. In some embodiments, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (ASICs), one or more microprocessors (DSPs), one or more field programmable gate arrays (FPGAs), or the like. For another example, when one of the foregoing modules is implemented in a form of invoking program code by a processing element, the processing element may be a general-purpose processor, for example, a central processing unit (CPU) or another processor that can invoke the program code. For another example, these modules may be integrated together and implemented in a form of a system-on-a-chip (SOC).

All or some of the foregoing embodiments may be implemented by using software, hardware, firmware, or any combination thereof. When the software is used to implement the embodiments, all or some of the embodiments may be implemented in a form of a computer program product. The computer program product includes one or more computer program instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive solid state disk (SSD)), or the like.

Figure 10:
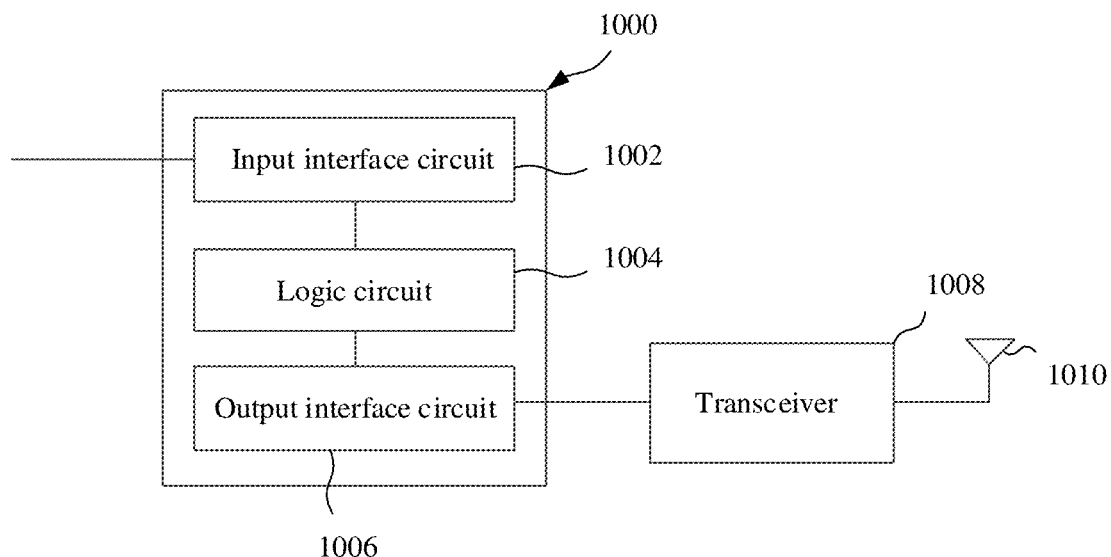
FIG. 10 is a module diagram of a structure of another beamforming apparatus according to at least an embodiment of the present disclosure.

Based on at least the same concepts as the beamforming method provided in the foregoing embodiments of this application, at least an embodiment of the present disclosure further provides a beamforming apparatus 1100, configured to implement the beamforming method in the foregoing embodiments. A part or all of the beamforming method in the foregoing embodiment may be implemented by using hardware, or may be implemented by using software. When the beamforming method is implemented by using hardware, as shown in FIG. 10, the beamforming apparatus 1000 includes:

an input interface circuit 1002, a logic circuit 1004, and an output interface circuit 1006. The beamforming apparatus 1000 further includes a transceiver 1008 and an antenna 1010. The transceiver 1008 sends/receives data by using the antenna 1010.

The logic circuit 1004 is configured to perform method steps of the radio access network device in the beamforming methods shown in FIG. 2 to FIG. 8. For details, refer to the descriptions in the foregoing method embodiments. Details are not described herein again. In some embodiments, the beamforming apparatus 1000 may be a chip or an integrated circuit.

Figure 11:
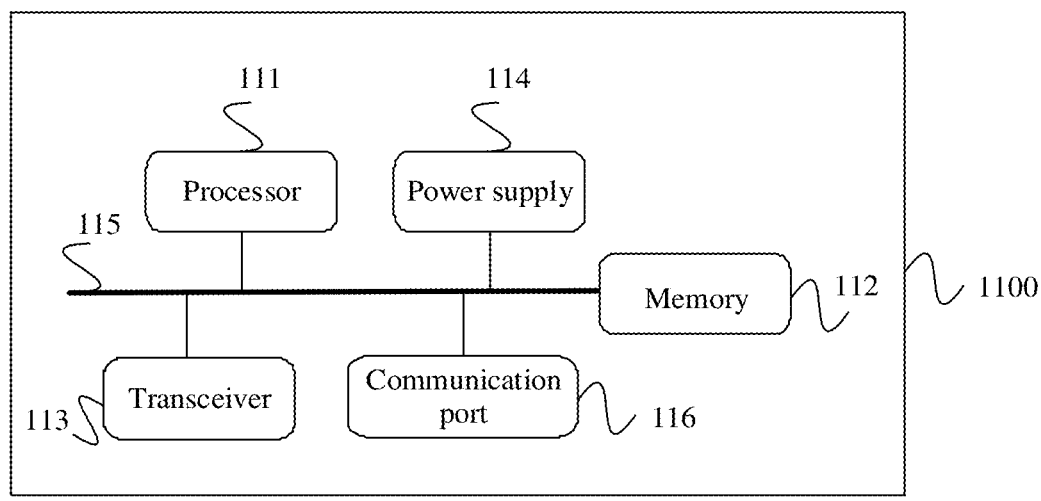
FIG. 11 is a schematic diagram of a structure of a radio access network device according to at least an embodiment of the present disclosure.

FIG. 11 is a schematic diagram of a structure of a radio access network device 1100 according to at least an embodiment of the present disclosure. As shown in FIG. 11, the radio access network device 1100 may include a processor 111 (for example, a CPU), a memory 112, and a transceiver 113. The transceiver 113 is coupled to the processor 111, and the processor 111 controls a receiving/sending action of the transceiver 113. The memory 112 may store various instructions, to complete various processing functions and implement method steps performed by the radio access network device in the embodiments of this application. In some embodiments, the radio access network device in this embodiment of this application may further include a power supply 114, a system bus 115, and a communication port 116. The transceiver 113 may be integrated into a transceiver of the radio access network device, or may be an independent transceiver antenna on the radio access network device. The system bus 115 is configured to implement a communication connection between components. The communication port 116 is configured to implement a connection and communication between the radio access network device and another peripheral.

In this embodiment of this application, the processor 111 is coupled to the memory 112, and is configured to read and execute instructions in the memory 112, to implement the method steps performed by the radio access network device in the foregoing method embodiments. The transceiver 113 is coupled to the processor 111, and the processor 111 controls the transceiver 113 to send and receive message. Implementation principles and technical effects thereof are similar, and details are not described herein again.

The system bus mentioned in FIG. 11 may be a peripheral component interconnect (PCI) bus, an extended industry standard architecture (EISA) bus, or the like. The system bus may be classified into an address bus, a data bus, a control bus, and the like. For ease of representation, only one bold line is used to represent the bus in the figure, but it does not mean that there is only one bus or only one type of bus. A communication interface is configured to implement communication between a database access apparatus and another device (for example, a client, a read/write library, or a read-only library). The memory may include a random access memory (RAM), or may further include a non-volatile memory (non-volatile memory), for example, at least one disk memory.

The processor may be a general-purpose processor, including a central processing unit CPU, a network processor (NP), and the like. The processor may alternatively be a digital signal processor DSP, an application-specific integrated circuit ASIC, a field programmable gate array FPGA or another programmable logic device, a discrete gate or a transistor logic device, or a discrete hardware component.

In some embodiments, the present disclosure further includes a computer-readable storage medium. The storage medium stores instructions. When the instructions are run on a computer, the computer is enabled to perform a processing process of the radio access network device in the foregoing embodiments.

In some embodiments, the present disclosure further includes a chip for running instructions. The chip is configured to perform a processing process of the radio access network device in the foregoing embodiments.

At least an embodiment of the present disclosure further provides a program product. The program product includes a computer program, the computer program is stored in a storage medium, at least one processor may read the computer program from the storage medium, and the at least one processor performs a processing process of the radio access network device in the foregoing embodiments.

In the embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally represents an "or" relationship between the associated objects, and the character "/" in a formula represents a "division" relationship between the associated objects. "At least one of the following items (pieces)" or a similar expression indicates any combination of these items, including a single item (piece) or any combination of plural items (pieces). For example, at least one of a, b, or c may represent a, b, c, a and b, a and c, b and c, or a, b, and c, where a, b, and c may be singular or plural.

It may be understood that various numbers in the embodiments of this application are merely used for differentiation for ease of description, and are not used to limit the scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

What is claimed is:

1. A beamforming method, comprising:
obtaining feature data, wherein the feature data comprises at least one of feature data of a terminal device or feature data of a cell, wherein the feature data of the terminal device represents azimuth information of the terminal device, and the feature data of the cell represents load information of the cell and distribution information of the terminal device;
obtaining a beamforming parameter based on the feature data and a machine learning model, wherein the beamforming parameter comprises at least one of a beam direction, a beam width, or a quantity of beams, wherein the obtaining the beamforming parameter based on the feature data and the machine learning model comprises:
determining the beam direction and the beam width based on a clustering processing result of a first machine learning model; and
performing beamforming on a first signal based on the beamforming parameter.

2. The method according to claim 1, wherein the obtaining the beamforming parameter based on the feature data and the machine learning model further comprises:
inputting the feature data of the terminal device into the first machine learning model of the machine learning model, wherein the first machine learning model is useable to perform clustering processing on the feature data of the terminal device.

3. The method according to claim 2, wherein the determining the beam direction and the beam width based on the clustering processing result of the first machine learning model comprises:
obtaining an azimuth center of each corresponding beam based on the clustering processing result of the first machine learning model;
obtaining the beam direction of each corresponding beam based on the corresponding azimuth center of the corresponding beam; and
determining the beam width of each corresponding beam based on the corresponding azimuth information of the terminal device corresponding to the beam in the clustering processing result.

4. The method according to claim 1, wherein after the obtaining the beamforming parameter based on the feature data and the machine learning model, the method further comprises:
adjusting the beamforming parameter based on preset constraint information, wherein the preset constraint information comprises at least one of coverage constraint information, interference constraint information, or load balancing constraint information.

5. The method according to claim 1, wherein the feature data of the terminal device comprises at least one of a horizontal azimuth of the terminal device or a vertical azimuth of the terminal device.

6. The method according to claim 5, wherein the obtaining feature data comprises:
obtaining at least one of the horizontal azimuth of the terminal device or the vertical azimuth of the terminal device based on measurement information of an uplink received signal.

7. The method according to claim 5, wherein the obtaining feature data comprises:
obtaining at least one of the horizontal azimuth of the terminal device or the vertical azimuth of the terminal device based on measurement information of a downlink reference signal and location information of the terminal device.

8. The method according to claim 5, wherein the feature data of the terminal device further represents at least one of traffic volume information of the terminal device or information of a quantity of resource blocks useable by the terminal device.

9. The method according to claim 1, wherein the obtaining the beamforming parameter based on the feature data and the machine learning model comprises:
inputting the feature data of the cell into a second machine learning model of the machine learning model, wherein the second machine learning model is useable to perform prediction processing based on the feature data of the cell; and
determining the quantity of beams based on a prediction processing result of the second machine learning model.

10. A beamforming apparatus, comprising a processor, wherein
the processor is configured to:
obtain feature data, wherein the feature data comprises at least one of feature data of a terminal device or feature data of a cell, wherein the feature data of the terminal device represents azimuth information of the terminal device, and the feature data of the cell represents load information of the cell and distribution information of terminal device;
obtain a beamforming parameter based on the feature data and a machine learning model, wherein the beamforming parameter comprises at least one of a beam direction, a beam width, or a quantity of beams, wherein the processor configured to obtain the beamforming parameter based on the feature data and the machine learning model comprises the processor being configured to:
determine the beam direction and the beam width based on a clustering processing result of a first machine learning model; and
perform beamforming on a first signal based on the beamforming parameter.

11. The apparatus according to claim 10, wherein the processor configured to obtain the beamforming parameter based on the feature data and the machine learning model comprises the processor being further configured to:
input the feature data of the terminal device into the first machine learning model of the machine learning model, wherein the first machine learning model is useable to perform clustering processing on the feature data of the terminal device.

12. The apparatus according to claim 11, wherein the processor configured to determine the beam direction and the beam width based on the clustering processing result of the first machine learning model comprises the processor being configured to:

obtain an azimuth center of each corresponding beam based on the clustering processing result of the first machine learning model;

obtain the beam direction of each corresponding beam based on the corresponding azimuth center of the corresponding beam; and determine the beam width of each corresponding beam based on the corresponding azimuth information of the terminal device corresponding to the beam in the clustering processing result.

13. The apparatus according to claim 10, wherein the processor is further configured to:

adjust the beamforming parameter based on preset constraint information, wherein the preset constraint information comprises at least one of coverage constraint information, interference constraint information, or load balancing constraint information.

14. The apparatus according to claim 10, wherein the feature data of the terminal device comprises at least one of a horizontal azimuth of the terminal device or a vertical azimuth of the terminal device.

15. The apparatus according to claim 14, wherein the processor configured to obtain the feature data comprises the processor being configured to:

obtain at least one of the horizontal azimuth of the terminal device or the vertical azimuth of the terminal device based on measurement information of an uplink received signal.

16. The apparatus according to claim 14, wherein the processor configured to obtain the feature data comprises the processor being configured to:

obtain at least one of the horizontal azimuth of the terminal device or the vertical azimuth of the terminal device based on measurement information of a downlink reference signal and location information of the terminal device.

17. The apparatus according to claim 14, wherein the feature data of the terminal device further represents at least one of traffic volume information of the terminal device or information about a quantity of resource blocks useable by the terminal device.

18. The apparatus according to claim 10, wherein the processor configured to obtain the beamforming parameter based on the feature data and the machine learning model comprises the processor being configured to:

input the feature data of the cell into a second machine learning model of the machine learning model, wherein the second machine learning model is useable to perform prediction processing based on the feature data of the cell; and determine the quantity of beams based on a prediction processing result of the second machine learning model.

19. A non-transitory computer readable medium, wherein the non-transitory computer readable medium has non-transitory instructions stored thereon, and in response to the non-transitory instructions being executed by a processor, cause the processor to perform:

obtaining feature data, wherein the feature data comprises at least one of feature data of a terminal device or feature data of a cell, wherein the feature data of the terminal device represents azimuth information of the terminal device, and the feature data of the cell represents load information of the cell and distribution information of the terminal device;

obtaining a beamforming parameter based on the feature data and a machine learning model, wherein the beamforming parameter comprises at least one of a beam direction, a beam width, or a quantity of beams, wherein the processor to perform the obtaining the beamforming parameter based on the feature data and the machine learning model comprises the processor to perform:

determining the beam direction and the beam width based on a clustering processing result of a first machine learning model; and performing beamforming on a first signal based on the beamforming parameter.

20. The non-transitory computer readable medium according to claim 19, wherein the processor to perform the obtaining the beamforming parameter based on the feature data and the machine learning model further comprises the processor to perform:

inputting the feature data of the terminal device into the first machine learning model of the machine learning model, wherein the first machine learning model is useable to perform clustering processing on the feature data of the terminal device.

\* \* \* \* \*

UNITED STATES PATENT AND TRADEMARK OFFICE
CERTIFICATE OF CORRECTION

| | | |
|---|---|---|
| PATENT NO. | : 12,089,064 B2 | |
| APPLICATION NO. | : 17/592590 | |
| DATED | : September 10, 2024 | |
| INVENTOR(S) | : Jun Lu et al. | |

It is certified that error appears in the above-identified patent and that said Letters Patent is hereby corrected as shown below:

In the Specification

Column 14, Line 25-30 should be replaced with:
$A_0$ represents the beam direction of the beam 0, $A_{N-1}$ represents the beam direction of a beam N–1, $A_0 > A_{N-1}$, $BW_i$ represents a 3 dB beam width of a beam i, $BW_i^{10}$ represents a 10 dB beam width corresponding to $BW_i$, and $\theta_1$ and $\theta_2$ are coverage offset azimuths preset based on an actual scenario requirement.

Signed and Sealed this
Fifth Day of November, 2024

Katherine Kelly Vidal
*Director of the United States Patent and Trademark Office*